United States Patent Office

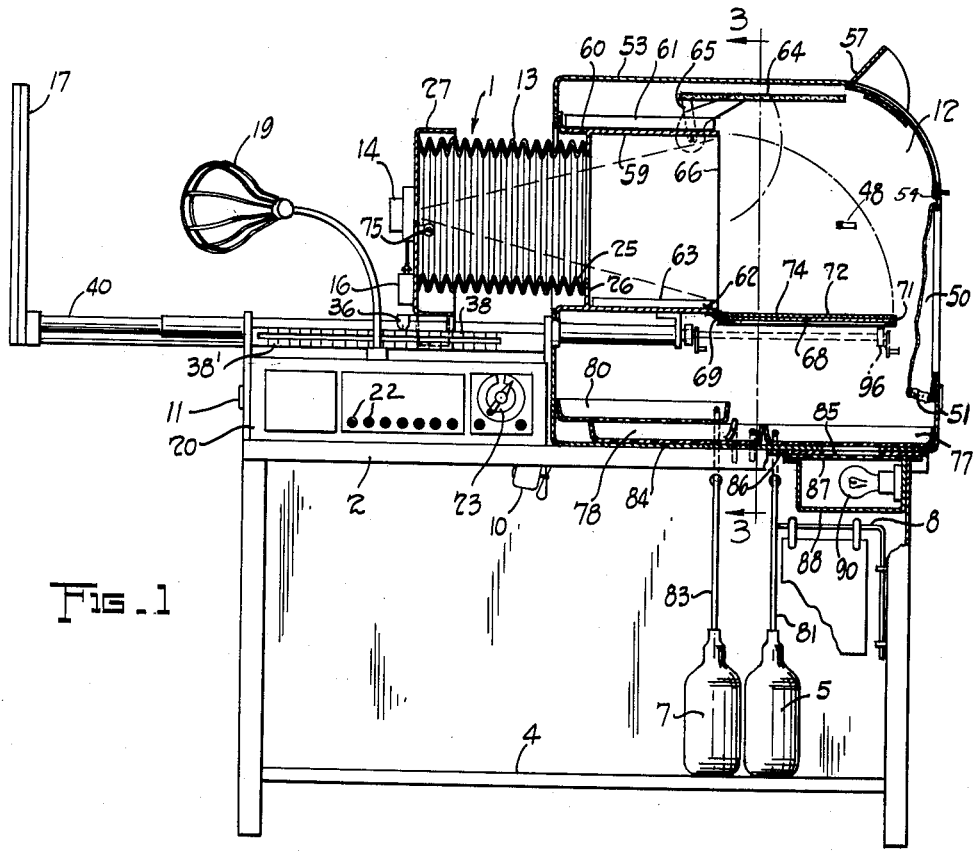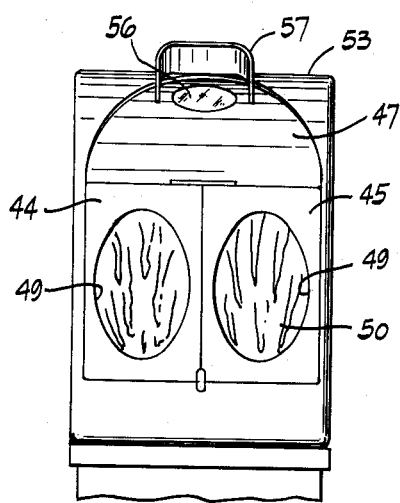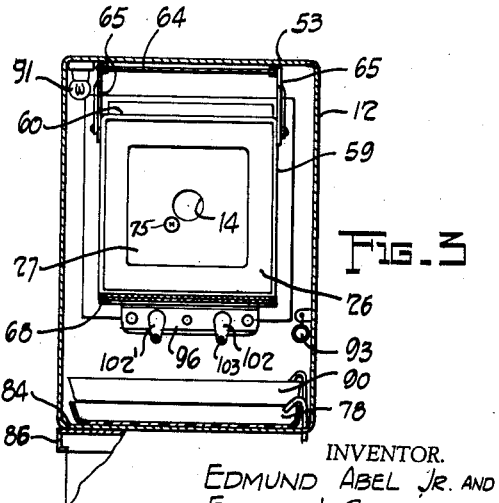

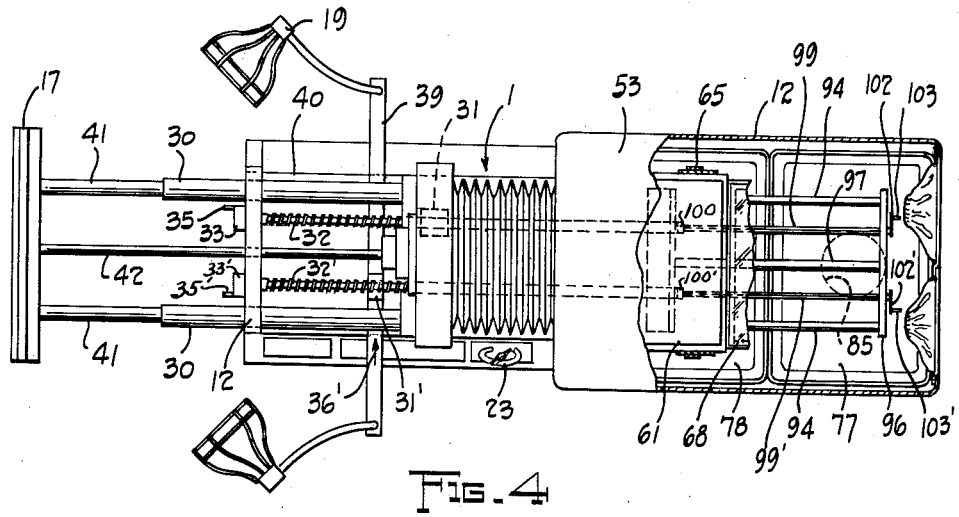

3,040,640
Patented June 26, 1962

3,040,640
PHOTOGRAPHIC DEVICE
Edmund Abel, Jr., 1315 Summit Ave., and Edgar J. Standring, 1437 Robinwood Ave., both of Lakewood, 7, Ohio
Filed Jan. 7, 1959, Ser. No. 785,460
2 Claims. (Cl. 95—11)

This invention relates to photographic apparatus and more particularly to apparatus for exposing and developing negatives and prints and the like.

A general object of this invention is to provide apparatus which is useful for making photographic reproductions at the same, reduced or enlarged size, developing and fixing the negatives, making prints or plates from the negatives and developing and fixing the prints and which has means for increasing and controlling the quality of the negatives and prints produced in and by the apparatus.

Another object of this invention is to provide new and improved apparatus, for exposing and developing negatives, prints and/or plates, which is economically manufactured, easily used and foolproof in operation; which has greater efficiency, facility and convenience and provides improved results over prior apparatus of a similar or related nature; and which includes a light-safe compartment adapted to function both as a box or back for the camera and a dark room wherein the negative, film, sensitized paper, etc., are manipulated and handled by an operator who remains outside of the compartment and apparatus.

Other objects of this invention include the provision of an improved developing tray for photographic apparatus, dark rooms and the like, which permits closer and more accurate control of the print or negative during development thereof and the provision of improved means for flashing and controlling the contrast of half-tone and other negatives.

Still other objects of this invention include the provision of a photographic process camera, adapted to function as a camera, a contact printer and a photographic dark room, which includes a film holder which is also a contact printer, which has a single means for both exposing the prints and plates and for flashing and controlling contrast of half-tone and other negatives; which is compact in size, portable and light-safe; which requires no external dark room or other protection from light; which is readily adapted for special uses and purposes; and which includes light-safe storage facilities for both cut and boxed film.

Another object of this invention is to provide a process camera having an improved, more economical threaded shaft for adjusting the focus of the camera and the position of the copyboard and to provide new method for making such threaded shafts, screw threads and the like; which does not require rolling, casting or milling and machining.

A further object of this invention is to provide photographic apparatus having one or more of the above advantages and objects.

These and other objects and advantages of this invention will appear from the following description of a preferred form thereof, reference being had to the drawings in which:

FIGURE 1 is a view partly in elevation and partly in vertical section of a process camera embodying a preferred form of this invention;

FIGURE 2 is a broken rear elevation of the process camera shown in FIGURE 1 with the doors to the compartment closed;

FIGURE 3 is a vertical section of the process camera shown in FIGURE 1, viewed along the line 3—3 of FIGURE 1.

FIGURE 4 is a top plan view of the process camera shown in FIGURE 1 with certain parts broken away to better show the structure thereof.

Broadly this invention comprises a complete, portable, process camera or photographic apparatus which includes complete developing facilities and in its preferred form functions as a camera, contact printer and dark room or photographic laboratory for developing the prints and negatives and may be provided with fluid storage facilities for solutions of developer and fixer, a fan, and racks or other means for drying prints and negatives, and means for developing photo-offset plates and the like.

A process camera embodying this invention also preferably includes improved means for flashing and controlling the contrast in half-tone negatives and visually controlling the progress of development of negatives and prints and is adapted to be manually operated and focused, including manipulation of the film and sensitized paper, by an operator situated behind and outside of the camera and having full visual control of the entire operation.

More particularly, as best seen in FIGURE 1, apparatus embodying this invention comprises a camera, indicated generally at 1, and a suitable stand 2. Stand 2 functions to support the camera and conveniently includes a shelf 4 upon which bottles 5 and 7 for solutions of developer and fixer, respectively, may be stored. Stand 2 is, also, conveniently provided with a hanger 8 upon which prints and negatives may be hung for drying and a fan 10 for blowing air over the prints and negatives to dry the same. Stand 2 also may include other accessory items such as storage drawers and a suitable, stainless steel surface on which to develop photo-offset plates and the like.

Camera 1 is supported on stand 2 by suitable brackets 11 and includes a housing or compartment 12 which functions as the back or box of the camera and as a dark room within which the sensitized film and paper is stored and handled, and exposed and developed. Camera 1 also includes a conventional camera bellows 13 extending longitudinally forwardly from compartment 12, a lens 14, having a shutter which is operated by solenoid 16, a copyboard 17 upon which the copy is mounted for photographing, one or more lights 19 for illuminating the copyboard and a control panel 20 having a plurality of switches 22 and a timer 23 interconnected by suitable wires and leads (not shown) with, inter alia, a power source, fan 10, solenoid 16, lights 19 and switches to function in the manner and for the purposes to be hereinafter more fully described.

In order to provide for adjusting the focus of the camera, the rearward end 25 of bellows 13 is secured to a flange 26 which is rigidly attached to the compartment 12 and the forward end of bellows 13 is secured to a rigid panel member or camera front 27 upon which lens 14 is mounted. Member 27 is adapted to slide on a pair of transversely spaced longitudinally extending shafts 30 which are supported by brackets 11.

Panel member 27 and thereby lens 14 is positioned on support shaft 30 by means of a follower nut 31 and screw 32, FIGURE 4. Nut 31 is secured to panel member 27 and threadably engaged over longitudinally extending screw 32, which is rotatably supported on brackets 11. Nut 31 therefore advances or retreats along the screw, moving the panel member 27 and lens 14, when the screw is rotated.

Preferably screw 32 is made by disposing a squared-wire, tempered spring over a hollow tube or bar having an external diameter substantially equal to the interior diameter of the spring and then plating the assembled tube and spring to hold the same in place and together, albeit screws made in other ways may be used with equal facility.

A knob 33 having a handle 35 is mounted at the forward end of screw 32 so as to be easily reached by an operator standing at the side of the camera and the lens 14 positioned by properly locating the pointer 36, carried by the panel member 27, along the scale 38. Screw 32 is also, preferably, adapted to be operated from the rear of the camera and to this end extends into the compartment 12 and is provided with an extensible handle as will hereinafter more fully appear.

Copyboard 17 and lights 19 are preferably mounted in fixed relative relationship and are adapted to be adjusted and positioned as a unit relative to and independently of the lens 14 and compartment 12. Lights 19 are mounted at either end of a cross bar 39 which is slidably supported on transversely spaced longitudinally extending guide rods 40 which are, also, supported by brackets 11. Copyboard 17 is supported at the forward end of extensions 41 which telescope into support shafts 30. A tie rod 42 rigidly connects the copyboard 17 with cross bar 39.

Copyboard 17 and lights 19 are positioned in substantially the same manner as the panel member 27. Thus follower nut 31' is secured to the cross bar 39 and threadably engages screw 32', which is otherwise substantially similar in structure to screw 32.

Screw 32' is provided with adjusting knob 33' having handle 35' and a pointer 36' on crossbar 39 indicates the position of the copyboard and lights on scale 38'. Screw 32' is also hollow and extends into compartment 12.

Compartment 12 functions both as the rearward end of the camera and as a light-safe dark room within which the film and sensitized paper may be stored, handled, exposed and developed. Further the compartment is adapted to permit an operator located outside the compartment to complete these operations with manual handling in complete light safely while under full visual inspection and control at all times. To this end the rearward end of the compartment is provided with an opening having three doors 44, 45 and 47, respectively, which when closed completely light-seal the compartment. Doors 44 and 45 are preferably hinged at either side of the opening and swing inwardly against the respective sides of the compartment and are releasably secured thereagainst by suitable latches 48, when open. Each of the doors 44 and 45 is provided with an aperture 48, which is surrounded by an inwardly extending, flexible sleeve 50 of opaque cloth or other suitable material. The operator gains operational access to the compartment 12 by inserting each of his arms through a sleeve 50. Each of the sleeves is provided with a narrow inner end 51 having an elastic band to grip the arm of the user and prevent light from passing into the compartment 12. The sleeves 50 are of sufficient length to permit full and substantially free movement of the operator's hands and arms within the compartment.

Door 47 closes the upper curved portion of the compartment opening and is adapted to slide downwardly from beneath the top 53 of the compartment into the closed position illustrated in FIGURE 1. Door 47 has a lower flange 54 which catches behind doors 44 and 45 when they are closed. Door 47 preferably has sufficient flexibility so that it lies flat and out of the way under top 53 when open, but is curved to fit the contours of compartment 12 when closed.

In order that the operator may observe and visually control the movement of his hands and arms within the compartment 12, door 47 is provided with a transparent sight 56 made of suitable light-safe material.

A shield 57 is mounted on the exterior of top 53 of compartment 12 and is adapted to shield sight 56 so that exterior light does not prevent or interfere with the operator seeing into the compartment.

The interior of compartment 12 is provided with the necessary fixtures and apparatus so that the process camera 1 functions as a camera, contact printer and photographic darkroom and the fixtures and apparatus are arranged to provide for the efficient and convenient use of the apparatus and so that the entire operation of the process camera is easily accomplished by the operator reaching into the compartment through sleeves 50.

Bellows 13 extend into compartment 12 as a rigid rectangular sleeve or open ended box 59 which is preferably formed integrally with flange 26. Box 59 is of smaller cross sectional area than compartment 12 and the top 60 of box 59 is adapted for use as a shelf on which to store packages of sensitized paper, film and the like, such as a container 61. Box 59 also conveniently has a double bottom 62 with a removable cover 63 for storing cut film and the like.

In order to provide for adjusting and focusing the copyboard and lens visually from behind and independently of the scales 38 and 38', a ground glass focusing screen 64 is pivotally supported on the sides of box 59 by hinges 65 and is adapted to cover the open end 66 of box 59 when the operator desires to focus the camera visually and to be swung up out of the way below top 53 of compartment 12 when focusing is completed or negatives or prints are to be exposed.

In order to provide for holding film for image exposure and developed negatives and sensitized paper or plates for printing or exposure, a film holder 68 is secured to box 59 by a hinge 69 preferably extending along the bottom edge of box end 66 so that holder 68 lies in a flat horizontal position when open. Holder 68 preferably comprises flanged rigid frame 71 and two glass plates 72 and 74 which fit within the frame and rest upon the flange. The upper surface of the upper glass plate 72 is preferably coated with a suitable pressure sensitive adhesive such as "Stay Flat" so that the film may be releasably held thereon. When the holder 68 is used as a contact printer the negative and paper are preferably held in place and together by being inserted between the glass plates 72 and 74. The film may also be held for image exposure in this manner.

In order to flash and control half-tone negatives and to expose prints and/or plates from negatives, lamp 75 is disposed within the bellows 13. Lamp 72 is preferably mounted on the inside of panel member 27 adjacent lens 14 so that the light therefrom is distributed evenly over the exposed surface of glass plate 69, or the film adhered thereto, when holder 68 is closed. Lamp 75 is preferably small 7½ watts for example, and is electrically interconnected with the control panel 20 and selectively interconnected with timer 23.

Compartment 12 also includes a plurality of photographic developing trays 77, 78 and 80 which contain developer solution, water and fixer solution, and are used in the usual way to develop negatives and prints.

Suitable hoses 81 and 83 interconnect trays 71 and 83 with bottles 5 and 7 respectively so that the developer and fixer solutions may be siphoned into the bottles for storage and reuse. Wash tray 78 is preferably connected by suitable connections (not shown) to a water tap and a drain.

In order to provide for exact and accurate visual control of the negatives and prints as they develop in the developer tray, thereby to insure that the developing is terminated at the optimum time. Tray 77 preferably rests directly on the bottom 84 of compartment 12 and is made of a transparent or translucent material such as plastic. An aperture 85 is provided in compartment bottom 84 and in the top 86 of stand 2 and is covered with a suitable filter 87. A box 88 having an ordinary lamp 90 is attached to the stand 2 beneath the aperture 85. Lamp 87 is connected electrically with the control panel 20 so that when film or prints are being developed the light 87 may be turned on and the developing picture observed through sight 56 by means of the light from lamp 90 which shines through filter 87 and tray 77, and evenly illuminates the entire tray, solution and negative or print, as the case may be.

Compartment 12 is also conveniently provided with a conventional safety lamp 91, FIGURE 3, for illuminating the interior of the compartment and a switch or latch string 93 for closing a pre-selected circuit and actuating the camera and/or light from within the compartment and behind the apparatus.

Additionally in order to facilitate adjusting and focusing the lens and copyboard when the film holder 68 is down (as it is in practice when the focusing screen is in use), see FIGURE 1, and yet provide for unobstructed use of the space within the compartment when the holder is folded up, the handles for turning screws 32 and 32' are made extensible so as to have an inner position as shown in full lines in FIGURE 1 and an outer position as shown in dotted lines in FIGURE 1 and in FIGURE 4.

Accordingly shafts 94 are adapted to slide within shafts 30 and are joined together at their outer ends by cross member 96. Cross member 96 also supports a fixed stop rod 97 which limits the outward travel of rods 94 and rotatably supports two hexagonal extension rods 99 and 99' which slide within screws 32 and 32', respectively.

In order that rods 99 and 99' may turn screws 32 and 32', caps 100 and 100' having a hexagonal hole therein is fitted on the ends of screws 32 and 32', respectively, within compartment 12. Rods 99 and 99' have a sliding fit within caps 100 and 100', respectively, but cannot rotate within the caps without also rotating the caps and screws upon which they are mounted. Rods 99 and 99' are rotated by means of knobs 102 and 102' which are mounted on rods 99 and 99'. respectively, and are respectively provided with handles 103 and 103'. Thus the cross member 96 may be pushed or pulled, in or out, to retract and extend the rods 99 and 99' with stop rod 97, preventing the assemblage from being pulled out completely and screws 32 and/or 32' are selectively rotated, through the engagement between rods 99 and 99' and caps 100 and 100', without regard to the position of cross member 96, by turning knobs 102 and 102' by means of handles 103 and 103', respectively.

In operation, to make a negative, the copy to be photographed is placed on the copyboard 17 and the lens 14 is focused and the copyboard and lights 19 positioned from the side by rotating knobs 35 and 35' to properly position pointers 36 and 36' on scales 38 and 38', respectively. Alternatively, with doors 44, 45 and 47 open, film holder 68 is folded down, focusing screen 64 is swung down across end 66 of box 59 and into the film plane. Cross member 96 is pulled out so that handles 103 and 103' are accessible and the handles are rotated until the desired focus is obtained as shown visually on the screen 64.

The lens aperture, switches and timer are then set as desired and the doors 44, 45 and 47 are then closed. The operator inserts his arms through sleeves 50 and removes a piece of cut film from container 62 and places it on the upper surface of glass plate 72. Film holder 67 is then folded up into the closed position and lanyard string 93 is pulled to make the exposure. The holder is swung down, the film removed, and, with lamp 90 on, placed in tray 77 for development. The operator observes the development of the negative as well as the other operations through sight 56. When the negative is developed it is transferred to the water tray 78 and the fixer tray 80 in the usual manner. The doors are opened and the negative removed from the compartment and dried. If the negative is to be a halftone, it is flashed by exposing it to the light from lamp 75 immediately after exposure to the copy.

To make a print or plate from the negative, the operator again closes the doors and with his arms through sleeves 50 removes the sensitized paper, for example, from the storage box 61 and places it and the negative between the glass plates 72 and 74. The film holder is then closed and the print is exposed by the light from lamp 75.

After exposure the print is developed in trays 77, 78 and 80 in the same manner as the negative, the development of the picture being exactly controlled in tray 77 because of the safe illumination provided by lamp 90 through filter 87.

The process camera 1 thus functions as a camera, contact printer and photographic darkroom operable from without the camera and providing an efficient compact apparatus which does not require a darkroom or other building alteration to be operable.

Those skilled in the art will appreciate that various changes and modifications can be made in the preferred form of apparatus described herein without departing from the spirit and scope of the invention.

We claim:

1. In a photographic apparatus the improvement of a housing forming a light-safe compartment, a bellows extending outwardly from said housing, exposure means at the outer end of said bellows, apertures in said housing providing access to said compartment, an opaque, flexible sleeve surrounding each said aperture and extending inwardly into said compartment and having an inner end adapted to engage the arm of an operator, a light-safe sight in said housing providing for visual control from without said compartment of the hand motions of the operator within said compartment, said bellows having an open end within said compartment, a film holder hingedly mounted within said compartment and having a closed position across said open end of said bellows and being adapted to hold films for image exposure and sensitized paper and film for contact printing exposure, said film holder having a flat open position extending rearwardly from said bellows, means for mounting the end of said bellows remote from said compartment for reciprocal movement and means for reciprocating said remote end of said bellows, said last named means including a screw shaft extending into said compartment and terminating adjacent said open end of said bellows, handle means for rotating said screw shaft from within said compartment and means supported on said screw shaft and reciprocable relative thereto to extend said handle means whereby said handle means has an inner position adjacent said open end of said bellows and an outer position adjacent said rearward edge of said film holder when said film holder is in said open position, a lamp mounted within said bellows and adapted to illuminate the inner surface of said film holder when said film holder is closed, and means to selectively actuate said lamp.

2. In a photographic apparatus the improvement of a housing forming a light-safe compartment, a bellows extending outwardly from said housing, exposure means at the outer end of said bellows, apertures in said housing providing access to said compartment, an opaque, flexible sleeve surrounding each said aperture and extending inwardly into said compartment and having an inner end adapted to engage the arm of an operator, a light-safe sight in said housing providing for visual control from without said compartment of the hand motions of the operator within said compartment, said bellows having an open end within said compartment, a film holder hingedly mounted within said compartment and having a closed position across said open end of said bellows and a flat open position extending rearwardly from said bellows, means for mounting the end of said bellows remote from said compartment for reciprocal movement and means for reciprocating said remote end of said bellows, said last named means including a screw shaft extending into said compartment and terminating adjacent said open end of said bellows, handle means for rotating said screw shaft from within said compartment and means supported on said screw shaft and reciprocable relative thereto to extend said handle means whereby said handle means has an inner position adjacent said open end of said bellows and an outer position adjacent said rearward edge of said film holder when said film holder is in open position.

References Cited in the file of this patent

UNITED STATES PATENTS

| | | | |
|---|---|---|---|
| 720,579 | Greenfield | Feb. 17, | 1903 |
| 1,207,036 | Hennigh | Dec. 5, | 1916 |
| 1,301,815 | Burrows | Apr. 29, | 1919 |
| 1,890,366 | Bowker | Dec. 6, | 1932 |
| 2,148,018 | Goldberg | Feb. 21, | 1939 |
| 2,408,247 | Wekeman | Sept. 24, | 1946 |
| 2,551,892 | Mitchell | May 8, | 1951 |
| 2,846,920 | Friedel | Aug. 12, | 1958 |